Robert J. Minshall
Albert A. Soderquist
Inventors

April 15, 1941. A. A. SODERQUIST ET AL 2,238,403
MASS BALANCING MEANS FOR CONTROL SURFACES
Filed Dec. 7, 1938 5 Sheets-Sheet 2
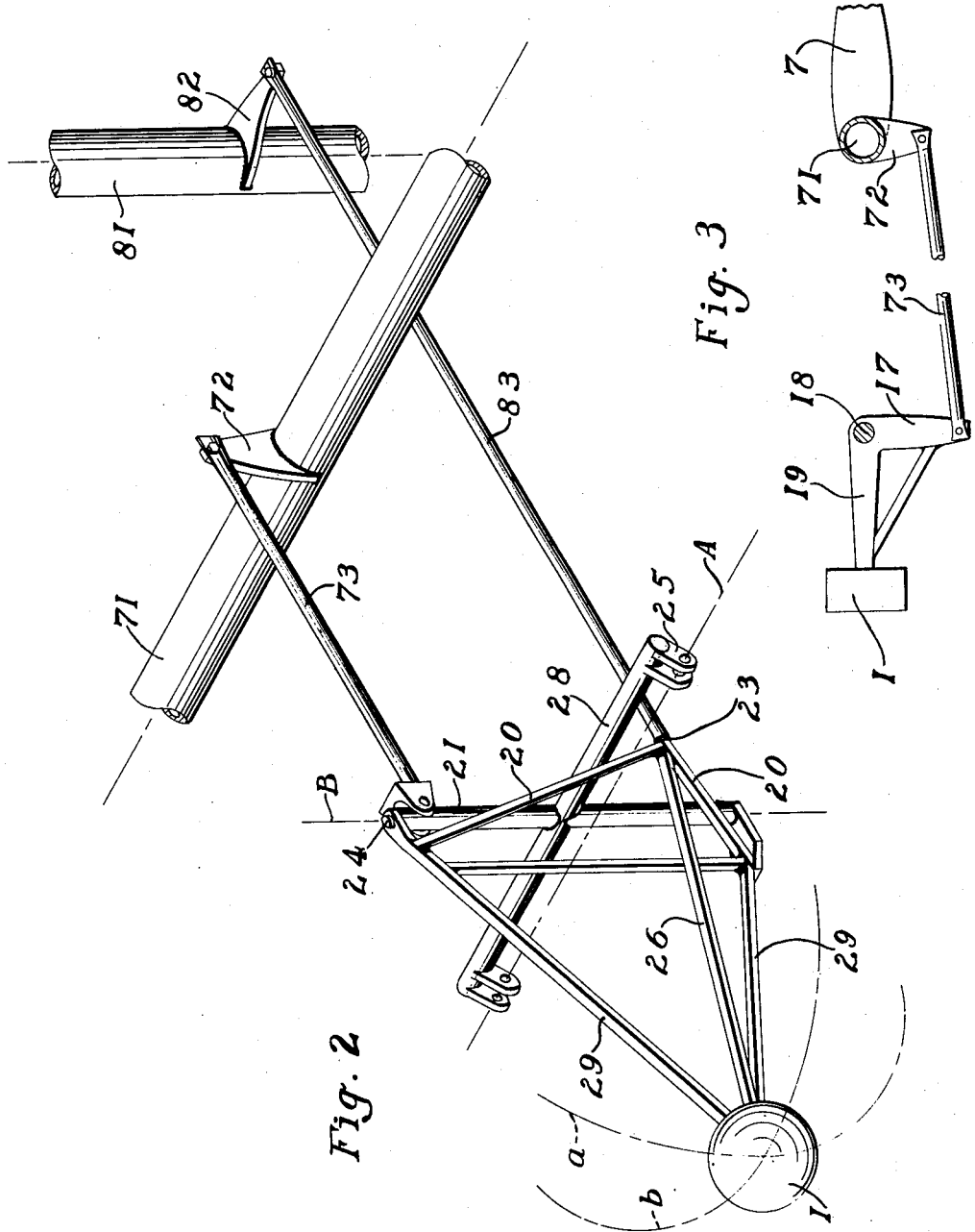
Robert J. Minshall
Albert A. Soderquist
Inventors
By Charles L. Reynolds
Attorney

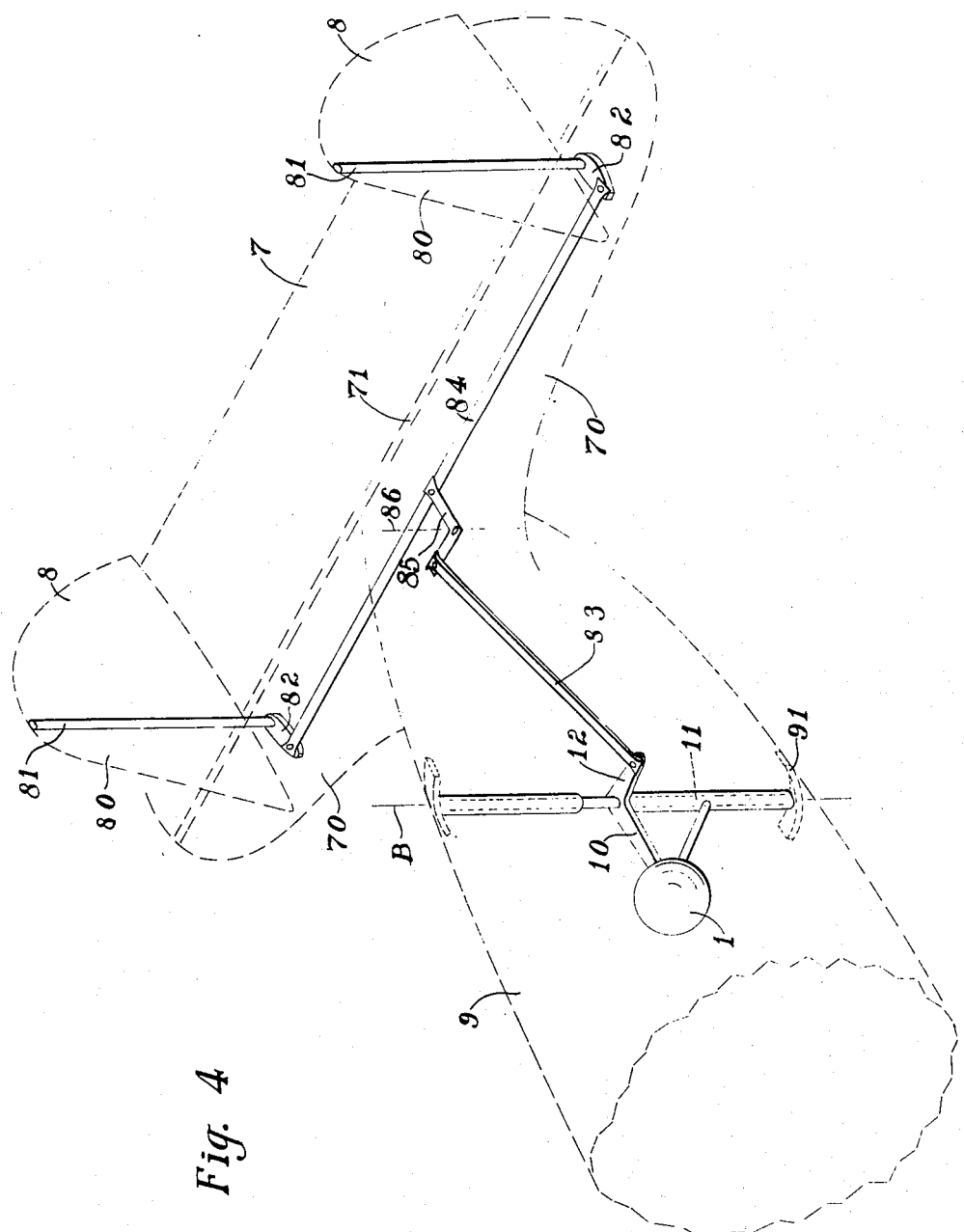

April 15, 1941.  A. A. SODERQUIST ET AL  2,238,403
MASS BALANCING MEANS FOR CONTROL SURFACES
Filed Dec. 7, 1938   5 Sheets-Sheet 4

Robert J. Minshall
Albert A. Soderquist
Inventors

By
Charles L. Reynolds
Attorney

Robert J. Minshall
Albert A. Soderquist
Inventors

Charles L. Reynolds
Attorney

Patented Apr. 15, 1941

2,238,403

UNITED STATES PATENT OFFICE 2,238,403

MASS BALANCING MEANS FOR CONTROL SURFACES

Albert A. Soderquist, near Seattle, and Robert J. Minshall, Seattle, Wash., assignors, by mesne assignments, to Boeing Aircraft Company, Seattle, Wash., a corporation of Washington Application December 7, 1938, Serial No. 244,452

18 Claims. (Cl. 244—87)

Our invention relates to the mass balancing of the control surfaces of an aircraft, made necessary because each such surface extends almost wholly to the rear of its pivot axis or support, and therefore constitutes an unbalanced weight which produces a torque about its pivot axis when the control surface is in its normal position; this torque must be mass-balanced in order that the surface will respond and move readily under the influence of the controls, and will not be moved by acceleration forces acting on the mass of the control surface.

This application is a continuation in part of application Serial No. 223,724, filed Aug. 8, 1938.

Such balancing has usually been accomplished heretofore by mounting weights within those panels of the surface that lie ahead of the hinge axis. For aerodynamic reasons the chord of the surface which is ahead of the hinge axis is usually short, and in some cases it is undesirable to have the surface project at all forwardly of the hinge axis. A long chord may produce undesirable aerodynamic balancing, and in addition constitutes a panel or leading edge which would, in some positions of the control surface, project from behind the fixed surface, usually disposed in front of the swingable control surface, and while flying in icing conditions such a projecting edge would tend to collect ice, leading to the necessity of providing deicer means, or, alternatively, to the likelihood of jamming the control surface by the accumulation of ice. Since, therefore, when there must be a part of the chord which is ahead of the hinge axis, this forward projection must be short, even when a balancing weight is thus placed ahead of the hinge axis. A large amount of weight is therefore required, because of its short moment arm. This added weight is undesirable, but has in such instances been considered a necessary evil.

Mass balancing weights, as distinguished from weighted control surface panels, have been applied directly to such a control surface, upon an arm or arms rigid with the control surface and which extend forwardly of the surface's hinge axis. Sometimes it is attempted to fair in or house these, to the greatest degree possible, within the aircraft structure immediately ahead of the control surface, but not infrequently such balancing masses are merely left out in the open, for it has been found impractical to house them, except to a minor degree or within drag-producing and air-flow-disturbing blisters protruding from the aircraft structure. When it is remembered that each of the three control surfaces which normally require such mass balancing—the rudder, the elevator, and the ailerons—is disposed at the trailing edge of a thin fixed surface ahead—the vertical fin, the horizontal stabilizer, and the wing, respectively—it will be seen why it is scarcely possible to apply mass balances thus directly to any one of these control surfaces, yet to keep it, throughout its necessary amplitude of swing, wholly inside the aerodynamic or streamline contours of the structure. Such a rigidly and directly connected mass balance must have an angular displacement from neutral position which is exactly equal to the angular displacement from neutral of the corresponding control surface. Such surfaces may be permitted or required to have 25°, 30°, or 35° angles of swing one or both ways from neutral. Even if the mass-carrying arm is short (which makes the actual mass large), such an angle of swing will carry the mass outside the aerodynamic surfaces of the fixed surface ahead of it; indeed, will carry the mass outside the aerodynamic surface of the thin tapering tail portion of the fuselage, if it be attempted to locate the mass therein. If the arm be longer, to reduce the actual mass, the situation is only aggravated, and the longer arm tends to interfere with installations within the structure.

It has appeared to be possible to employ only a mass balance upon the end of a rigidly connected arm, and to suffer the mass to swing outwardly of the aerodynamic contours, with such fairing as can be afforded by blisters, or to form the balancing mass as a panel of the control surface itself, ahead of and close to the hinge axis, hence of appreciable actual mass because of the short moment arm.

It is a primary object of this invention to provide a mass balance for such a control surface, which may have a large moment arm with respect to the hinge axis, which will swing oppositely to the direction of swing of the control surface behind the hinge axis, and which, because of the large moment arm, will permit great reduction in the actual mass employed, to that extent reducing the weight of the airplane.

The principles of this invention are applicable to any control surface, as the rudder, elevator, or aileron. It will be convenient to describe it as applied to the rudder or to the rudder and elevators, yet it will be understood that any control surface is intended to be included as within the scope of the invention, though a specific surface may be named.

The present invention pertains to the mass balancing of aircraft control surfaces, to restrain departure of such surfaces from an established position under the influence of mass acceleration forces, such as gravity, momentum, and centrifugal force. Our balancing mechanism is unaffected by aerodynamic forces or aircraft attitude, and has no tendency to compensate either for aerodynamic disturbance of the control surfaces or for change of aircraft attitude, and never produces positive or aircraft controlling movement of such control surfaces. Such mechanism is instead designed to create the torque required to balance that set up by the action of one or more of such mass acceleration forces on a control surface, in every attitude of the aircraft and for every control surface position. The balancing weight employed is always acted upon by such a mass acceleration force at the same time, to an equivalent extent, and in the same manner that such force acts upon the control surface, so that such weight exerts a force on the control surface only when, and to the extent that, the control surface tends to be moved in the opposite direction by such force. As a result there is little or no unbalanced force on the control surface. Our mechanism should not be confused with pendulous controlling weights which have been proposed but never used to effect positive controlling movement of aircraft control surfaces in response to changes in attitude of the aircraft, for, as stated, our balancing system exerts no force upon the control surfaces except to directly counteract the effect of a mass accelerating force similarly and simultaneously acting upon a control surface, so that there can be no force residue created by our mechanism which would tend to move positively the control surface. Furthermore, it is to be noted that our mechanism is not intended to prevent movement of the control surface by aerodynamic forces, or to restore the control surface to an established position when displaced therefrom by aerodynamic forces.

Our mechanism, then, operates not to effect control, automatic or pendulous, but merely to balance the mass of the control surface so that the pilot or the servomotor need not be required to overcome such mass acceleration forces. A fighting plane, for example, is often required to pull sharply out of a fast dive. At that critical movement the unbalanced weight of the elevator is acting downward, centrifugal force tends to throw the elevator away from the center of the turn, namely, in a downward direction, and the momentum of the airplane, which may be equal to as much as fifteen times the pull of gravity, is also acting downward on the elevator. As a result, in the absence of mass balancing mechanism, many times the normal torque will be exerted by such mass acceleration forces to swing the elevator down, yet the pilot, in order to pull out of the dive, must not only overcome such excessive torque, but also the aerodynamic forces, and swing the elevator in an upward direction to effect the necessary control of the airplane. Yet it is in just such maneuverable fighting airplanes that high speed is of paramount importance, and consequently a mass balancing system of small weight, and disposed to afford little or no air resistance, is highly desirable. Both vertical and horizontal control surfaces are subjected to such forces, although to a lesser extent, in turning and other maneuvers, and hence both types of surfaces should be mass balanced.

It is usual practice to mount the empennage at the extreme rear end of the body or fuselage. As has been pointed out above, airplane bodies of good aerodynamic shape are always quite narrow in this region. It is therefore not feasible to swing a balance weight within the body on a long arm, rigidly attached to the rudder, nor yet on a short arm, as sufficient room does not exist to allow adequate swing, in either such case. It is a further object, then, so to mount the balance weight, with respect to the body and to the control surface, as to allow adequate swing of a sufficiently long arm and hence a small mass, yet to keep the weight within the aerodynamic surfaces of the aircraft.

There are, at the tail end of a conventional airplane body, the rudder or rudders and the elevators or elevator. Both such surfaces are movable, and each must be properly balanced. The effective balancing mass which will balance one such surface properly may not properly balance the other such surface, and it would appear to be necessary to employ two such balancing masses. However, it is a further object of the invention to provide an arrangement such that one mass may serve for the balancing of each of the two surfaces, the rudder and the elevator, forming part of the empennage, thereby not only achieving the advantage of cutting down the actual mass for balancing by the employment of a longer moment arm, but further reducing the total mass by employing this single mass for balancing of both such surfaces.

It is also an object to provide a system of the character indicated, wherein the effective mass may be regulated, and greater or lesser balancing effect may be obtained from any given mass, with respect to any given control surface, by altering the mechanical advantage between this mass and any particular surface to which it may be connected for balancing thereof.

It is also an object to apply the system, when necessary, to multiple surfaces, as for instance dual rudders, balancing both such rudders by a single mass.

It is also an object, in a modified form, to provide means so arranged that the balancing mass lies within the elevation of the control surface, yet has no projection forward of the leading edge of the surface, beyond its normal leading edge, which may be concentric with the hinge axis.

Since almost all airplanes are provided with comparatively heavy pieces of equipment such as motors, generators, etc., that must be carried for use during normal operation, or such as anchors, that must be available when needed, but which may seldom be needed, and since such equipment need not be fixed immovably with respect to the aircraft structure or body, it is an object so to design the mass balancing means that such equipment, sometimes while in use and sometimes while only stowed away, may serve as the means to produce a counter-torque about the hinge axis of a control surface, thereby in effect eliminating completely from the aircraft's load the mass balance for such surface.

It is also an object to connect the mass balance to the control surface in such a way that the latter's hinge axis may be completely divorced from any influence that the mass may exert, other than the torque counter to that produced by the control surface.

Broadly considered, it is the object of the invention to devise and provide means for mass balancing an aircraft control surface, without the necessity of employing a panel or a mass projecting forwardly from the hinge axis of the control surface, and so arranged as to reduce the weight of the mass necessary for balancing the control surface or surfaces.

With these and other objects in view, as will appear hereafter, our invention comprises the novel balancing means, the novel combination and arrangement thereof in any one of several forms, with one or with a plurality of control surfaces, all as shown in the accompanying drawings, and as will be described in this specification and more particularly pointed out by the claims which terminate the same.

In the accompanying drawings we have shown our invention embodied in various illustrative forms, it being understood that the arrangements shown are for purposes of illustration only.

Figure 2 is an enlarged perspective view of the same type of balancing mechanism alone.

Figure 3 is a side elevation, showing the invention applied to a single surface, and arranged in such manner that the mass has a certain mechanical advantage over the control surface.

Figure 4 is a view similar to Figure 1, but showing the invention as applied to the balancing of dual rudders only.

Figure 1:
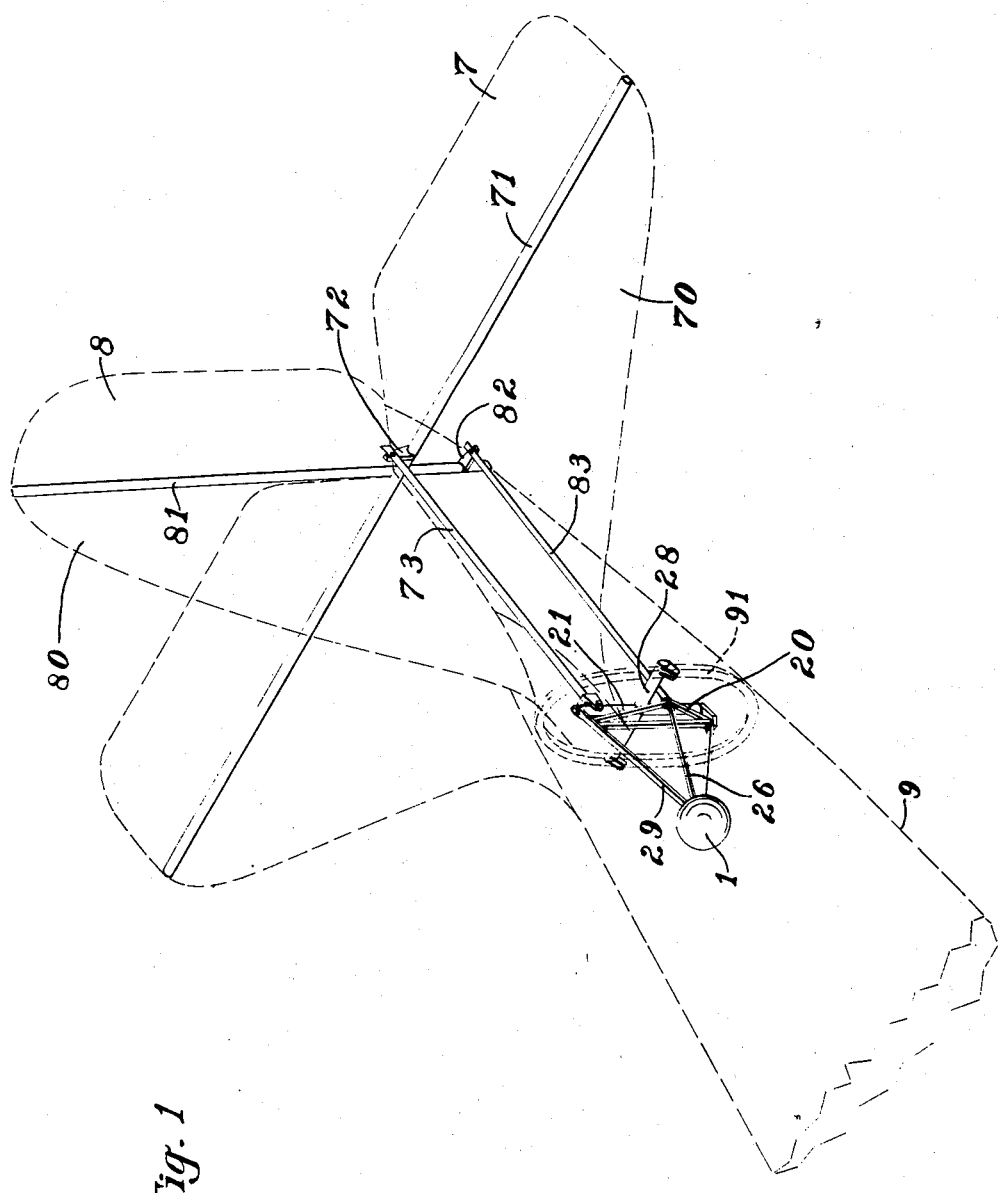
Figure 1 is a perspective shadow view of the rear end of an aircraft body and empennage, showing the balancing devices arranged in operative relationship to the aircraft structure and control surfaces, showing the invention applied both to the rudder and to the elevators.

The invention in a simple form, though not in the simplest possible form, is well illustrated in Figure 4. Here a fuselage 9 supports at its tail end the elevator 7, disposed ahead of and hinged to a horizontal stabilizer 70, and dual rudders 8, each disposed behind and hinged to a fixed fin 80. The hinge axis of the elevator is shown as the torque tube 71, and the hinge axes of the rudders are shown as the torque tubes 81. Neither rudder projects materially forward of its hinge axis, being concentric about such hinge axis.

Mass balancing of the rudders is accomplished by means of a mass 1 which is located distant from the rudders, preferably within the fuselage 9, and sufficiently forward of the tail end of the latter that the mass 1 may have adequate room for swinging, within the limits necessary, upon its supporting arm 10, swinging about the axis B of a hinge mounting 11. The arm 10 is connected to the torque tubes 81 of the rudders by any suitable connection, such as the mechanical linkage consisting of the arms 82 fast on the torque tubes, the transverse tie rod 84, the bell crank lever 85, upon an axis 86, within the fuselage or within the horizontal stabilizer 70, and the link 83 connecting to an arm 12 which is disposed angularly with respect to the arm 10. The arms 10, 12 are therefore part of a bell crank lever rotatable about the axis B, supported from the fuselage structure 91.

It will be evident that the mechanical advantage between the torque tubes 81 and the arm 10 may be varied as may be found necessary or expedient, in the present arrangement the arm 10 being longer than the arm 12, and the arm 12 being substantially equal to the arms of the bell crank lever 85 and to the arms 82. The mass 1 has a mechanical advantage such that its actual mass may be made less than if it were mounted at the end of a short arm corresponding to the length of the arm 82 and directly connected to a rudder.

If we consider a force of inertia applied to the center of mass of the rudders 8 (behind their hinge lines), in such manner as will tend to swing them to the right of the airplane, that same force will necessarily be applied similarly to the balancing mass 1, and will tend to swing that mass to the same side of the airplane. If the actual mass, moment arm, and mechanical advantage be properly chosen, the force developed by the mass 1 at the hinge lines of the rudders will exactly balance and cancel the force developed by the rudders' mass. As a result there is no mass force tending to oppose movement of the rudders by the normal controls. The rudders are mass-balanced, yet without using a heavy mass, and without requiring any projection into the airstream of the balancing mass. The arrangement, as is evident, can be applied equally well, and with like effect, to a single rudder or to any other control surface.

In Figure 3 such a mass is shown connected to the single elevator 7. The torque tube 71 of the elevator 7 carries an arm 72 connected by a link 73 to an arm 17 which is one arm of the bell crank lever hinged at 18, the other arm 19 carrying the mass 1. The arm 19 in this arrangement is longer than the arm 17, and the latter in turn is longer than the arm 72. In this arrangement the mass 1, by reason of the long arm 19, may be made less than if it were connected by a short arm 72 directly to the elevator, but it need not swing through as great an angular deflection as the elevator by reason of the difference of length of the arms 17 and 72.

Figure 8:
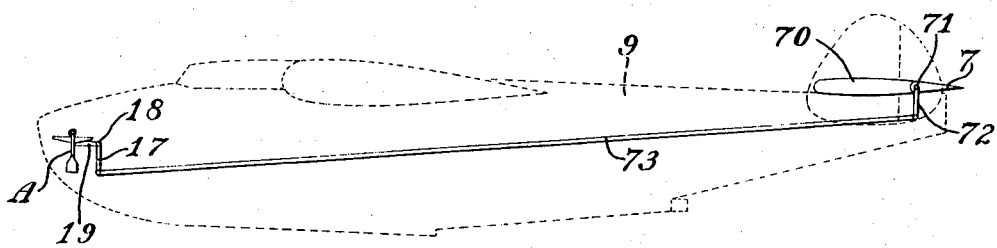
Figure 8 is an elevation, largely diagrammatic, showing how a piece of necessary equipment may be employed as the balancing mass.

The arrangement shown in Figure 8 is similar to that of Figure 3, except as to the mechanical advantage, to the great distance of the balancing mass from the balanced surface, and to the use of an anchor A as the balancing mass. Such an anchor is required, for occasional use on flying boats, and is normally stowed in the bow compartment. It is therefore entirely feasible to support this anchor upon the arm 19, and to arrange and proportion the linkage that its weight balances the mass of the elevator 7— that is, the anchor through the linkage produces a torque at the hinge axis 71 that is opposite to and substantially equal to the torque produced at that axis by the elevator 7. The anchor, when needed to moor the craft, is readily unshipped, and yet its absence does not affect the elevator, since the elevator will only be used as such after the anchor is again shipped upon the lever arm 19. In similar fashion other equipment, as a generator, may be so employed, its weight being necessary in any event, and its use in such manner reducing by so much the total weight that the airplane must otherwise carry, and which would be devoted solely to mass balancing. While a rigid link 73 has been illustrated in Figure 8 as connecting the lever arm 72 at the tail to the lever arm 17 at the nose, it will be clear that this is merely representative of any positive connection, whether rigid and whether mechanical, or otherwise. Any connecting means which will positively translate torque about the axis 18 into torque about the axis 71, always opposite in direction and substantially equal in amount, will satisfy the requirements of this invention in such respects.

In Figures 1 and 2 the single mass 1, whatever may be its character or location, is employed to balance not a single control surface, but two such surfaces, thereby saving considerable weight. The mass 1 in this arrangement is in effect carried upon a gimbal mount, whereby it may swing about each of two axes which are angularly disposed relative to one another, just as the axes of the torque tubes 71 and 81 are angularly disposed. The two axes of swing of the mass are conveniently generally parallel each to its respective torque tube. The mass 1 is mounted upon a cross instead of upon a single arm, which cross has the horizontal arms 28 and the vertical arms 21. The arms 28 are provided with pivot brackets 25, whereby the cross as a whole may tilt about a horizontal axis A, parallel in this instance to the axis of the torque tube 71 of the elevator. This axis A is defined by suitable pivot supports (not shown) upon the fuselage bulkhead 91.

Instead of carrying the mass 1 directly upon the cross 21, 28, in order to give it a long moment arm it is carried upon a triangular or tripod element including the arms 29, 20 and 26. This tripod structure is pivotally mounted by the arms 29 to the ends of the cross arm 21, as indicated by the pivot pin 24, so that the tripod as a whole may swing about the axis B at right angles to axis A, though axis B may tilt relative to the vertical, or relative to the longitudinal center line of the fuselage. In its neutral position the mass 1 should be substantially in the longitudinal center line of the fuselage, and while the mass is carried forwardly within the fuselage from the hinge axes, in order to obtain sufficient room for the amount of swing required, it should be located as nearly as possible adjacent the torque tubes in order that stresses may not be set up within the fuselage structure between the mass and its mounting and the control surfaces and their mountings.

As is clear in the drawings, Figures 1 and 2, the link 73 connects the lever arm 72 upon the torque tube 71 with the cross arm 21 upon the cross 21, 28, and at such distance from the axis A as to give the mass 1 an adequate movement to balance the elevator 7, the mass moving in the arc $a$ and tilting about the axis A. The link 83 connects the lever arm 82 on the rudder's torque tube 81 with the end of the arms 20 of the tripod, connecting by a universal joint 23, so that it may tilt the tripod about the axis B to swing the mass laterally in an arc $b$.

Either of these swinging movements may occur alone, or two such movements may occur simultaneously. The mechanical advantage between the mass and each of the lever arms 72 or 82 is so chosen with relation to the actual mass 1 that notwithstanding different requirements of the two surfaces, the one mass may accomplish proper balancing of each surface or of the two simultaneously, thereby very materially reducing the weight of the aircraft by complete elimination of one balancing mass altogether, and making it possible to reduce the weight further by increasing the lever arm which supports the mass, and thereby making it possible for a smaller actual mass to produce a greater balancing effect, by reason of its greater effective mass resulting from the longer lever arm or greater mechanical advantage in the operative connections to the control surface.

Figure 7:
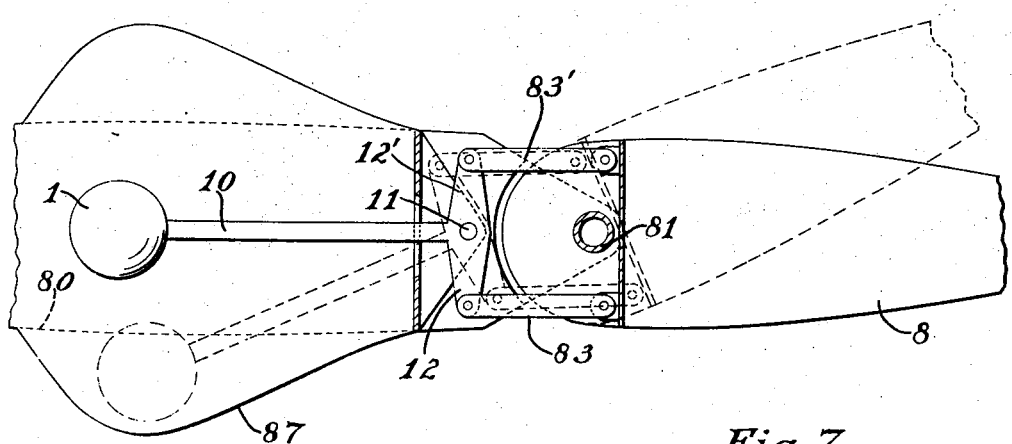
Figure 7 is a plan view of a modified arrangement, wherein the control surface's torque tube has no stress, other than torque, applied to it from the balancing mass.

To avoid stresses on the torque tube 81 of a rudder 8, for instance, and on the empennage structure, other than torque on the torque tube, and in order to keep the balancing mass 1 and its lever arm 18 close to the rudder balanced thereby, the arrangement of Figure 7 may be adopted. The hinge axis 11 of the lever arms 18 and 12 is close to the torque tube 81, and the arm 12 is doubled, to include the arm 12'. Each of these equal arms 12 and 12' is connected, by the links 83 and 83', to the rudder 8 at equal distances at either side of the torque tube 81. The thrust of link 83 is balanced equally by the pull of link 83', and vice versa, so that only torsion results about the torque tube 81. The mass 1 is close up to the rudder which it balances, so close that the torque and countertorque are applied to the empennage, including the fin 86, at a common point, and resistance against any tendency to flutter is more easily designed for, since the forces are simplified and their points of application are reduced in number. If the fin is too thin to permit sufficient amplitude of swing to the mass 1, it may be provided with faired-in blisters 87, so that the mass may still swing wholly within the confines of the structure.

In the forms heretofore discussed the balancing mechanism is or should be wholly enclosed within the aircraft structure, and wholly outside the elevation of the control surface which is being balanced. It is possible, however, and in some cases may be desirable in order to avoid conflict with controls and other instrumentalities extending through the narrow tail of the fuselage, to mount the balancing mass wholly exteriorly of the fuselage, and preferably within the normal panel outline or elevation of the control surface.

Figure 5:
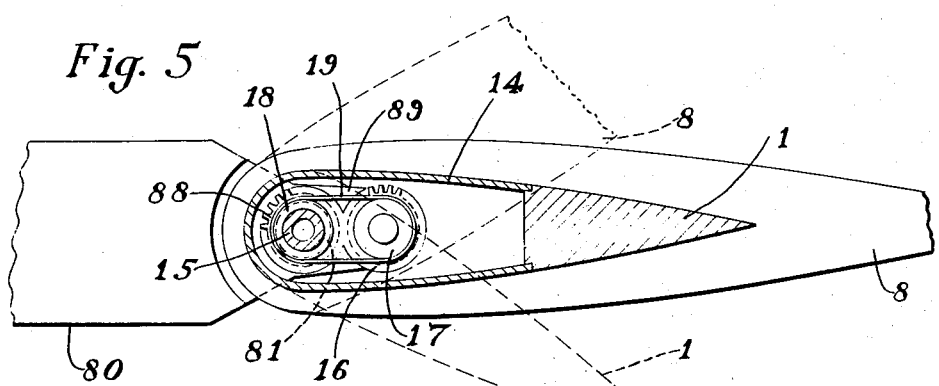
Figure 5 is a plan view, and Figure 6 an elevation, showing the invention applied in a modified form to a rudder only, and within the elevation of the rudder panel.
Figure 6:
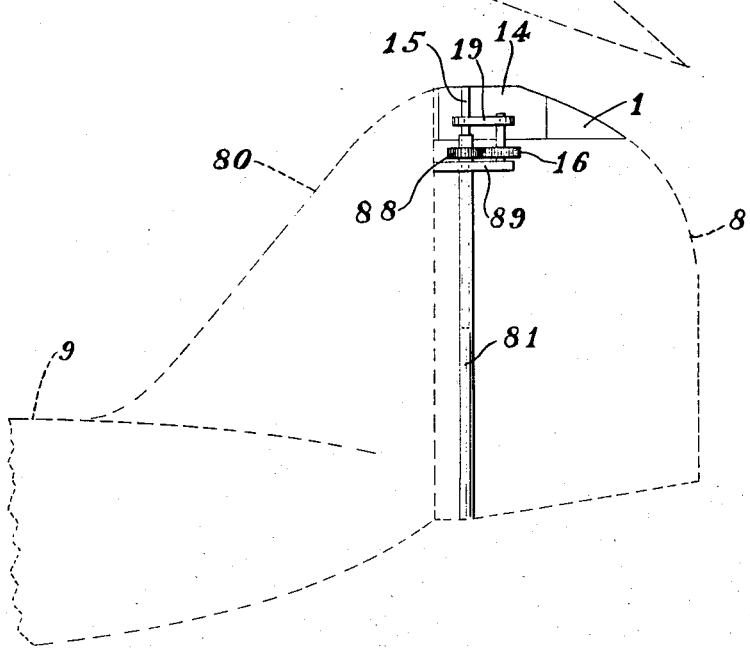

Such an arrangement is shown in Figures 5 and 6. Here the mass 1 extends rearwardly from the hinge axis defined by the torque tube 81, but is swingable independently of and oppositely to the rudder 8. It is supported upon an arm 14 hinged at 15 preferably coaxially with the torque tube 81, and is connected to the torque tube by means of a gear 88 fast upon the torque tube 81, meshing with a gear 16 carried upon a bracket 89 extending forwardly from the fin 86, the gear 16 in turn being connected to the post 15 by pulleys 17 and 18, connected by a belt 19, or by equivalent means. The pulleys and belt might be omitted, and the arm 14 be carried upon the axis of the gear 16, but it would then have an overhang forwardly of its hinge axis, which would swing outside the protection afforded by the fin 86.

If a given force tends to swing the rudder 8 to the right, as shown in dash lines in Figure 5, the same force tends to swing the mass 1 to the right. This tendency is mutually resisted through the gearing connections described and shown, each tending to swing the other in the opposite direction, or to the left, with the result that neither swings, and mass balancing is accomplished. It will be clear that the length of the arm 14 may be any that is found suitable, and that the longer this arm the less the actual mass 1 need be. Its aerodynamic effect, though opposite to the effect of the rudder, is so slight as to be negligible. While the arm 14 and the rudder 8, either or both of them, may swing past the drive connections to and the support of the arm 14, these elements may be notched to permit passage beyond the drive elements, and indeed, the latter in actual practice will be condensed or made of such size that such provisions may readily be made, or will be unnecessary.

It will be understood that the arrangements shown and described in detail are merely illustrative, and are not intended to be restrictive, and various changes may be made in the individual elements and in their relative arrangement without departing from the spirit of our invention as hereinafter defined.

What we claim as our invention is:

1. In combination with a hingedly mounted aircraft control surface, balancing means therefor including a mass movably mounted within the elevation of the swingable surface, and at the same side of but independently of the surface's hinge axis, and means operatively connecting the surface and said mass, to move the latter compensably and oppositely by and in accordance with swinging movement of the control surface.

2. In combination with a hingedly mounted aircraft control surface, balancing means therefor including a mass movably mounted upon the aircraft structure independently of the surface's hinge axis, and means operatively connecting the surface and said mass, to move the latter compensably by and in accordance with swinging movement of the control surface, the entire balancing means being disposed, in all operative positions of the surface, within the elevation of the surface.

3. In combination with an aircraft structure, a control surface hingedly mounted thereupon, a piece of aircraft equipment of appreciable mass pivotally mounted within the aircraft structure, independently of the hinge mounting of the control surface, and means connecting the latter mass and the control surface, the several elements being organized and arranged that the mass produces at the hinge axis of the control surface a torque counter to and substantially equal to the torque there produced by the mass effect of the control surface in every attitude of the aircraft and for every swung position of the control surface.

4. In combination with an aircraft structure, a control surface hingedly mounted thereon and normally controlled, a balancing mass swingably mounted, upon an axis independent of and spaced from the axis of the control surface, and in all its positions carried wholly within the normal aerodynamic contour of the aircraft structure, and means operatively connecting the control surface and the mass, and so organized and arranged that the mass swings in correspondence to the surface's swinging throughout the latter's range, and in all swung positions of the control surface substantially balances the surface's mass.

5. Mechanism for mass balancing an aircraft control surface subjected to mass acceleration forces, comprising a control surface, a hinge about which said control surface swings, weight means, pivot means independent of but parallel to said control surface hinge, guiding said weight means for swinging, and torque transmitting means interconnecting said weight means and said control surface hinge, said weight means exerting an opposed balancing torque on said control surface hinge through said connecting means under the influence of every mass acceleration force tending to swing said control surface about its hinge, and the size and disposition of said weight means, and the mechanical advantage and arrangement of said connecting means, being such as to create such an opposed balancing torque on said control surface hinge in every attitude of the aircraft and for every swung position of the control surface substantially equal to the torque exerted on its hinge by the control surface under the action of the same mass acceleration force, thereby to counteract such control surface torque and to restrain movement of the control surface by such mass acceleration force.

6. Mechanism for mass balancing an aircraft control surface subjected to mass acceleration forces, comprising a control surface, a hinge about which said control surface swings, weight means, means independent of and spaced from said control surface hinge, guiding said weight means for movement, and torque transmitting means interconnecting said weight means and said control surface hinge, said weight means exerting an opposed balancing torque on said control surface hinge through said connecting means under the influence of a mass acceleration force tending to swing said control surface about its hinge, and the size and disposition of said weight means, and the mechanical advantage and arrangement of said connecting means being such as to create such an opposed balancing torque on said control surface hinge substantially equal to the torque exerted on its hinge by the control surface under the action of the same mass acceleration force, thereby to counteract such control surface torque and to restrain movement of the control surface by such mass acceleration force.

7. Mechanism for mass balancing an aircraft control surface subjected to mass acceleration forces, comprising a control surface, a hinge at the forward edge of said control surface about which it swings, a pivot support generally parallel to but spaced from said control surface hinge, a balance weight pivotally mounted upon said pivot support and disposed forward thereof, and means interengaged between said weight and said control surface hinge to effect conjoint swinging of said weight and said control surface about their respective axes in the same rotative sense, a mass acceleration force acting simultaneously upon both said weight and said control surface thereby influencing said weight to produce a torque upon said control surface hinge opposed to the torque exerted thereon by said control surface under the influence of the same mass acceleration force.

8. Mechanism for mass balancing an aircraft control surface subjected to mass acceleration forces, comprising a control surface, a hinge at the forward edge of said control surface about which it swings, a pivot support, a balance weight disposed rearwardly of said pivot support and guided thereby for swinging, and means interengaged between said balance weight and said control surface hinge to effect conjoint swinging of said weight and said control surface about their respective axes in the opposite rotative senses, a mass acceleration force acting simultaneously upon both said weight and said control surface thereby influencing said weight to produce a torque upon said control surface hinge opposed to the torque exerted thereon by said control surface under the influence of the same mass acceleration force.

9. Mechanism for mass balancing an aircraft control surface subjected to mass acceleration forces, comprising a control surface, a hinge about which said control surface swings, balancing weight means supported independently of said control surface and said hinge, and torque transmitting means interengaged between said balancing weight means and said control surface, said weight means and said torque transmitting means being constructed and arranged to exert a balancing torque on said control surface through said interconnecting means, under the influence of a mass acceleration force tending to swing said control surface about its hinge, in the direction opposite to the torque exerted by the control surface under the action of the same mass acceleration force, thereby to generally counteract such control surface torque and to restrain movement of the control surface by such mass acceleration force.

10. Mechanism for mass balancing a plurality of aircraft control surfaces subjected to mass acceleration forces, comprising two control surfaces, two hinges, each control surface swingable about one such hinge, and said hinges being relatively angularly disposed, a single balancing weight, and torque transmitting means interconnecting said weight with each of said control surfaces, said weight exerting an opposed balancing torque on each control surface through said interconnecting means under the influence of a mass acceleration force tending to swing such a control surface about its hinge, thereby to counteract the torques exerted by said control surfaces under the action of the same mass acceleration force and to restrain movement of said surfaces by such a force.

11. Mechanism for mass balancing a plurality of aircraft control surfaces subjected to mass acceleration forces, comprising two control surfaces, two hinges, each control surface swingable about one such hinge, and said hinges being relatively angularly disposed, a single balancing weight hingedly mounted for swinging movement about each of two axes which are generally parallel to the two hinges of the control surfaces, and torque transmitting means interconnecting said weight with each of said control surfaces, said weight exerting an opposed balancing torque on each control surface through said interconnecting means under the influence of a mass acceleration force tending to swing such a control surface about its hinge, and said means being constructed and arranged to afford the proper relative mechanical advantage between said weight and the respective control surfaces in proportion to their respective inertias, so as to create such an opposed balancing torque on each of said control surfaces or on both simultaneously substantially equal to the torques exerted by the respective control surfaces under the action of the same mass acceleration force, thereby to counteract the torques of both control surfaces and to restrain movement thereof by such a force.

12. Mechanism for mass balancing a plurality of aircraft control surfaces subjected to mass acceleration forces, comprising two control surfaces, two hinges, each control surface swingable about one such hinge, and such hinges being relatively angularly disposed, a single balancing weight, an arm swingable universally within limits about a point, carrying said balancing weight, and supported independently of said control surfaces, and independent torque transmitting means connecting said arm separately to each of said control surfaces, said balancing weight exerting an opposed balancing torque on each control surface through its respective connecting means under the influence of a mass acceleration force tending to swing such control surface about its hinge, and the size and disposition of said weight together with the arrangement and relative mechanical advantage of the respective connecting means being such that said weight creates such an opposed balancing torque on each control surface, in every attitude of the aircraft and for every swung position of each control surface, substantially equal to the respective torques exerted by the control surfaces under the action of the same acceleration force, said single weight thereby generally counteracting such torques of said control surfaces and restraining movement thereof by such a mass acceleration force.

13. Mechanism for mass balancing a plurality of aircraft control surfaces subjected to mass acceleration forces, comprising two control surfaces, such as an elevator and a rudder, a vertical and a horizontal hinge, one of said control surfaces, such as the rudder, being swingable about the vertical hinge, and the other control surface, such as the elevator, being swingable about the horizontal hinge, a gimbal mount spaced from said hinges and swingable about generally vertical and horizontal axes, a generally horizontal arm extending forward from and supported by said gimbal mount and universally swingable within limits about its axes, a balancing weight carried by the forward end of said arm, and means interconnecting said arm with both of said aircraft control surfaces to effect conjoint swinging of said weight with each of said surfaces, the horizontal and vertical components of swing of said weight being in the same rotative sense as the swinging of the respective control surfaces, a mass acceleration force acting simultaneously both upon said weight and upon one or both of said control surfaces thereby influencing said weight to produce a torque upon one or both of said control surfaces opposed to the torque or torques exerted by them under the influence of the same mass acceleration force.

14. Mechanism for mass balancing an aircraft control surface subjected to mass acceleration forces, comprising a control surface, a hinge at the tail of the aircraft body about which such control surface swings, balancing weight means supported within the aircraft body forward of the control surface, and torque transmitting means interengaged between said balancing weight means and said control surface, said weight means and said torque transmitting means being constructed and arranged to exert a balancing torque on said control surface through said interconnecting means, under the influence of a mass acceleration force tending to swing said control surface about its hinge, in the direction opposite to the torque exerted by the control surface under the action of the same mass acceleration force, thereby to counteract such control surface torque and to restrain movement of the control surface by such mass acceleration force.

15. Mechanism for mass balancing an aircraft control surface subjected to mass acceleration forces, comprising a control surface, a hinge at the forward edge of such control surface about which it swings, a pivot support spaced from but disposed substantially parallel to such control surface hinge, an arm pivoted upon and extending generally forward from said pivot support, a balancing weight carried by the swinging end of said arm, a cross bar secured to and movable with said arm, and generally parallel links connected between the respective ends of said cross bar and said control surface to effect conjoint swinging of said balancing weight and said control surface in the same rotative sense, a mass acceleration force acting simultaneously upon both said weight and said control surface thereby influencing said weight to produce a torque upon said control surface opposed to the torque exerted by said surface under the influence of the same mass acceleration force.

16. Mechanism for mass balancing a vertical aircraft control surface, comprising a vertical control surface, such as a rudder, an upright hinge about which said control surface swings, balancing weight means, means independent of said control surface and control surface hinge guiding said balancing weight means for movement substantially in a horizontal plane, and torque transmitting means interconnecting said weight means and said control surface, said weight means exerting an opposed balancing torque on said control surface through said connecting means under the influence of a mass acceleration force tending to swing said control surface about its hinge, thereby to counteract the torque exerted by said control surface under the action of the same mass acceleration force and to restrain movement of the control surface by such force.

17. Mechanism for mass balancing a horizontal aircraft control surface, comprising a normally horizontal control surface, such as an elevator, a horizontal hinge about which said control surface swings, balancing weight means, means independent of said control surface and said control surface hinge guiding said balancing weight means for generally vertical movement, and torque transmitting means interengaged between said weight means and said control surface to effect conjoint opposite movement thereof, said weight means moving downward as such control surface moves upward, and vice versa, and said weight means exerting an opposed balancing torque on said control surface through said connecting means under the influence of a mass acceleration force tending to swing said control surface about its hinge, thereby to counteract the torque exerted by said control surface under the action of the same mass acceleration force and to restrain movement of the control surface by such force.

18. In an aircraft, in combination with a control surface hingedly mounted with its center of mass rearwardly of its hinge line, to produce a given hinge moment at its hinge line under the influence of a given force having a transverse component in a given direction applied at the control surface's center of mass, an element hingedly mounted upon the aircraft structure, independently of the control surface's hinge mounting, to produce a given hinge moment at its hinge line under the influence of the same transverse force acting in the same direction upon such element, and means positively connecting the element and the control surface in such manner that the two moments are opposed at the control surface's hinge line, the actual mass of the element and the mechanical advantage of its connection to the control surface's hinge line being so chosen that the opposing moments tend to equalize each the other.

ALBERT A. SODERQUIST.
ROBERT J. MINSHALL.